(12) United States Patent
Ikeda et al.

(10) Patent No.: US 7,171,218 B2
(45) Date of Patent: Jan. 30, 2007

(54) MOBILE UNIT, SERVER AND METHOD OF PROVIDING INFORMATION

(75) Inventors: Takehiro Ikeda, Yokosuka (JP); Koji Omae, Yokohama (JP); Ichiro Okajima, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 171 days.

(21) Appl. No.: 10/801,595

(22) Filed: Mar. 17, 2004

(65) Prior Publication Data

US 2004/0185850 A1 Sep. 23, 2004

(30) Foreign Application Priority Data

Mar. 20, 2003 (JP) .............................. 2003-078915

(51) Int. Cl.
*H04Q 7/20* (2006.01)
(52) U.S. Cl. .............................. 455/456.1; 455/456.2; 455/456.3; 455/456.5; 455/456.6; 455/450; 455/451; 455/452.1; 455/436; 455/432.1; 455/435.1; 455/552.1; 455/553.1; 455/440; 455/437; 455/438
(58) Field of Classification Search ..... 455/456.1–457, 455/450–452.1, 436, 432.1, 435.1–435.2, 455/552.1, 553.1, 440, 437–438
See application file for complete search history.

(56) References Cited

U.S. PATENT DOCUMENTS

| | | | | |
|---|---|---|---|---|
| 5,214,789 | A * | 5/1993 | George | 455/440 |
| 6,125,278 | A * | 9/2000 | Wieczorek et al. | 455/437 |
| 6,292,743 | B1 * | 9/2001 | Pu et al. | 701/202 |
| 6,331,825 | B1 * | 12/2001 | Ladner et al. | 340/988 |
| 6,716,101 | B1 * | 4/2004 | Meadows et al. | 455/456.1 |
| 2002/0082044 | A1 | 6/2002 | Davenport | |

FOREIGN PATENT DOCUMENTS

| | | |
|---|---|---|
| CN | 1326653 A | 12/2001 |
| EP | 1 021 055 | 7/2000 |
| GB | 2 313 257 | 11/1997 |
| GB | 2313257 | * 11/1997 |
| GB | 100 64 955 | 7/2002 |
| JP | 11-259569 | 9/1999 |
| JP | 2002-218547 | 8/2002 |
| WO | WO 00/30384 | 5/2000 |
| WO | WO 01/50788 | 7/2001 |
| WO | WO 02/076131 | 9/2002 |

* cited by examiner

*Primary Examiner*—Steve M. D'Agosta
(74) *Attorney, Agent, or Firm*—Oblon, Spivak, McClelland, Maier & Neustadt, P.C.

(57) ABSTRACT

A mobile unit capable of communication using a plurality of communication subsystems including a usability determination section to determine usability of the plurality of communication subsystems at the current location of the mobile unit. The mobile unit also includes a communication subsystem selection section for selecting a communication subsystem whereby the current location of the mobile unit can be measured with highest accuracy. A mobile telephone network communication section in the mobile device then measures the current location of the mobile unit and transmits the result of determination of usability, together with information indicating the current location, to an information provision server. Then, the mobile unit is able to look up the result of determination of usability from a plurality of mobile units that is stored in the information provision server.

3 Claims, 12 Drawing Sheets

Fig.2

| USE PRIORITY | COMMUNICATION SUBSYSTEM TYPE |
|---|---|
| 1 | MOBILE TELEPHONE |
| 2 | WIRELESS LAN |
| 3 | WIRED LAN |

Fig.3

| LOCATION | USABLE COMMUNICATION SUBSYSTEMS |
|---|---|
| LATITUDE X1, LONGITUDE Y1 | MOBILE TELEPHONE |
| LATITUDE X2, LONGITUDE Y2 | MOBILE TELEPHONE, WIRELESS LAN |
| LATITUDE X3, LONGITUDE Y3 | MOBILE TELEPHONE, WIRELESS LAN |
| LATITUDE X4, LONGITUDE Y4 | MOBILE TELEPHONE, WIRELESS LAN |
| LATITUDE X5, LONGITUDE Y5 | WIRELESS LAN |
| LATITUDE X6, LONGITUDE Y6 | MOBILE TELEPHONE |
| LATITUDE X7, LONGITUDE Y7 | MOBILE TELEPHONE |
| LATITUDE X8, LONGITUDE Y8 | |
| LATITUDE X9, LONGITUDE Y9 | |
| LATITUDE X10, LONGITUDE Y10 | MOBILE TELEPHONE, WIRELESS LAN |
| LATITUDE X11, LONGITUDE Y11 | MOBILE TELEPHONE, WIRELESS LAN |
| LATITUDE X12, LONGITUDE Y12 | WIRELESS LAN |
| LATITUDE X13, LONGITUDE Y13 | |
| ⋮ | ⋮ |

Figure 8:
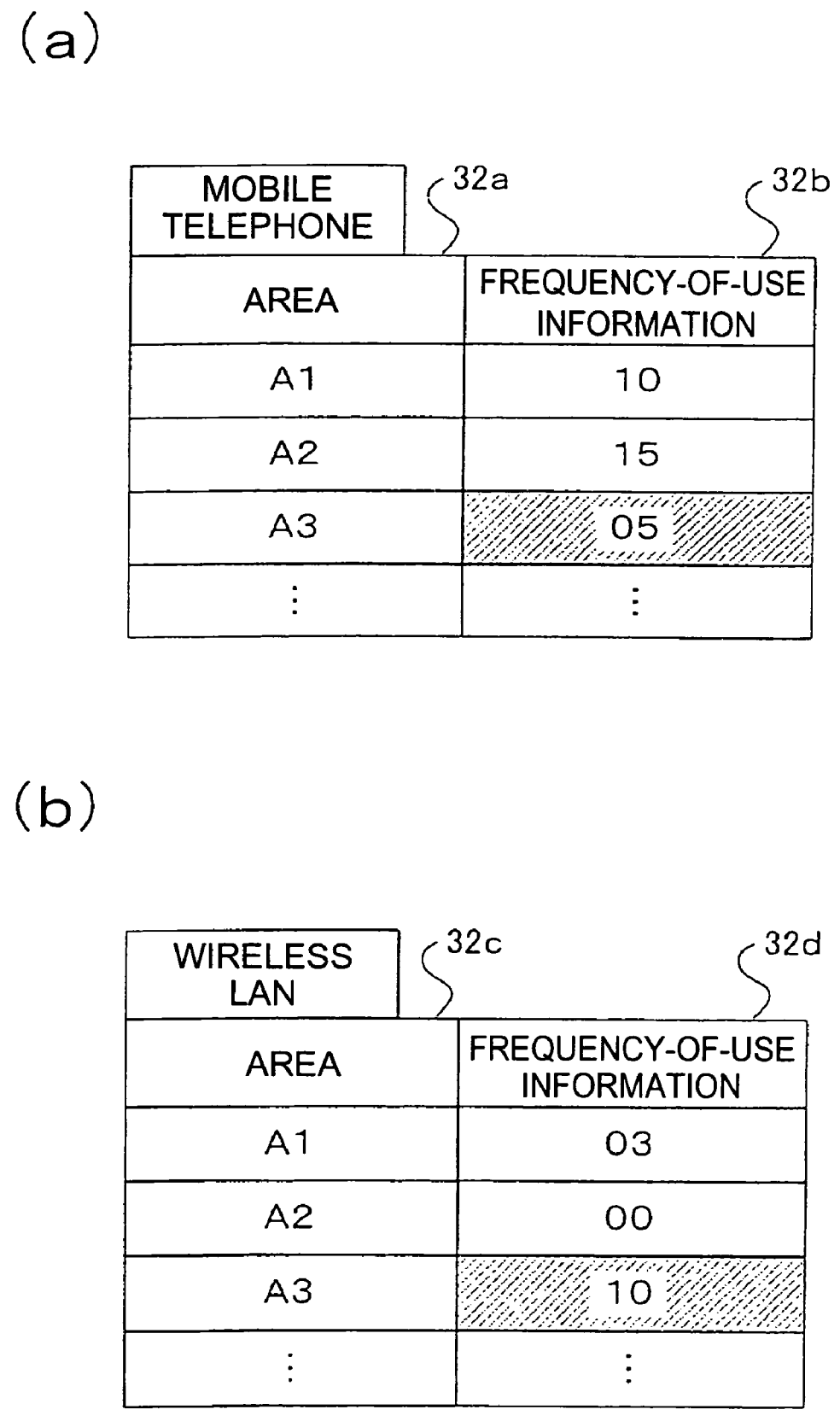

| MOBILE TELEPHONE 32a | 32b |
|---|---|
| AREA | FREQUENCY-OF-USE INFORMATION |
| A1 | 10 |
| A2 | 15 |
| A3 | 05 |
| ⋮ | ⋮ |

(b)

| WIRELESS LAN 32c | 32d |
|---|---|
| AREA | FREQUENCY-OF-USE INFORMATION |
| A1 | 03 |
| A2 | 00 |
| A3 | 10 |
| ⋮ | ⋮ |

Fig.9
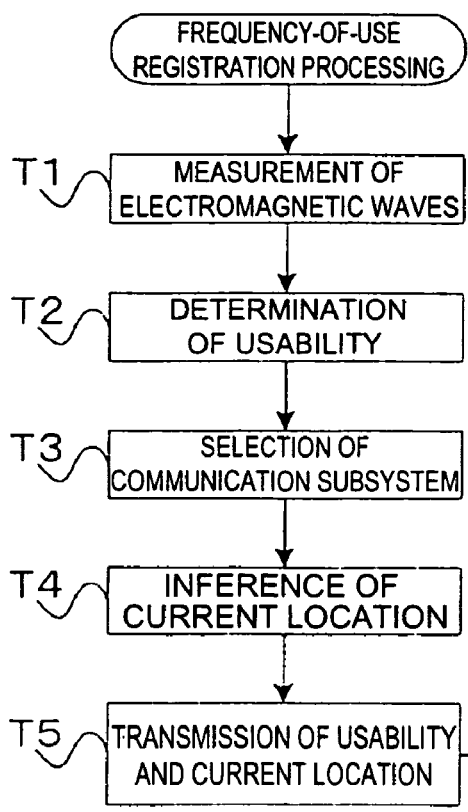
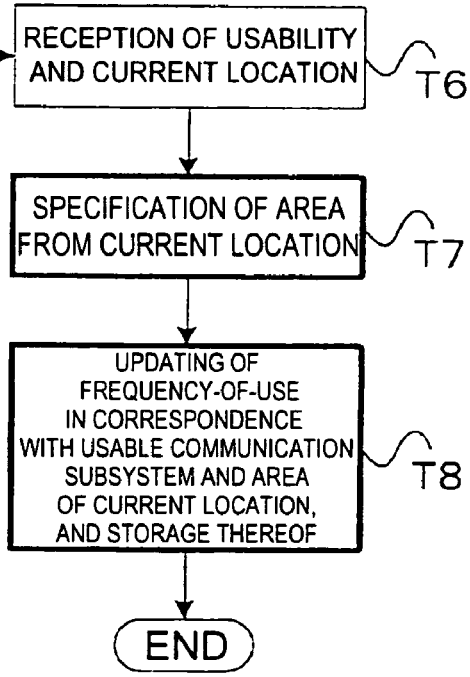

MOBILE UNIT, SERVER AND METHOD OF PROVIDING INFORMATION

BACKGROUND OF THE INVENTION

1. Field of the Invention

The present invention relates to a mobile unit, a server, and a method of providing information.

2. Related Background Art

Previously, with the development of locating techniques using wireless communication, various techniques have been proposed that utilize the current location of a mobile unit. For example, Patent Document 1 discloses an HLR (Home Location Register) which, when it is detected that a mobile unit is located in a specific region such as a hospital, implements restriction of communication of this mobile unit. Also, Patent Document 2 discloses a technique whereby a mobile unit sends to a server locational information as to where a product is located and information relating to the product and the server provides such information to another mobile unit.

[Patent Document 1] Japanese Patent Application Laid-open No. 2002-218547 (page 1, FIG. 1, FIG. 4)

[Patent Document 2] Japanese Patent Application Laid-open No. H11-259569 (page 3, FIG. 3)

SUMMARY OF THE INVENTION

However, all of the prior art techniques described above presuppose that the mobile unit is only capable of communication using a single communication system (also called communication subsystem) at the position where its location is inferred. In other words, they are not focused on the aspect of making a selection of a communication subsystem capable of being employed in the above device, from a plurality of communication subsystems. Also, the usability of various communication subsystems changes over time depending on the presence of obstacles and on environmental conditions, such as weather, even when a mobile unit is located in the same position. However, it was difficult for the user of a mobile unit to accurately ascertain the usability, at an arbitrary location, of a plurality of communication subsystems which were subject to change over time.

Accordingly, an object of the present invention is to make it possible to ascertain with a high degree of accuracy the usability in a mobile unit of a plurality of communication subsystems that change with time.

In order to solve the above problem, in a mobile unit that is capable of communication using a plurality of communication subsystems, a mobile unit according to the present invention comprises: determination means that determines usability of the plurality of communication subsystems at the current location of said mobile unit; selection means that selects a communication subsystem whereby the current location can be measured with the greatest accuracy, of the communication subsystems that are determined as usable by said determination means; and transmission means whereby said current location is inferred using the communication subsystem selected by said selection means and the result of determination of said usability by said determination means is transmitted, together with information indicating said current location, using the communication subsystem selected by said selection means.

A mobile unit according to the present invention is an information device having a communication function and that is capable of being carried by a user and may be for example a mobile telephone, PDA (personal digital assistant) or PC (personal computer).

A server according to the present invention comprises: communication means that receives the result of determination of said usability transmitted by the transmission means of the mobile unit described above, together with information indicating said current location; and storage means that stores the result of determination of said usability received by said communication means as geographical information, in correspondence with information indicating said current location, in updateable fashion.

Preferably a server according to the present invention further comprises: communication subsystem specification means that specifies a communication subsystem that is usable at said current location or at a location designated by said mobile unit, by looking up geographical information stored in said storage means; and in that said communication means notifies said mobile unit of the usable communication system specified by said communication system specification means, in response to a request from the mobile unit.

A method of information provision according to the present invention includes: a determination step in which a mobile unit that is capable of communication using a plurality of communication subsystems determines usability of a plurality of communication subsystems at the current location of said mobile unit; a selection step in which the mobile unit selects a communication subsystem whereby the current location can be most accurately measured, of the communication subsystems determined as usable in said determination step; a transmission step in which the mobile unit infers said current location using the communication subsystem selected in said selection step and transmits the result of determination of said usability in said determination step, together with information indicating said current location, using the communication subsystem selected in said selection step; and a reception step in which a server receives the determination result of said usability transmitted in said transmission step, together with information indicating said current location; a storage step in which the server stores in storage means in updateable fashion the result of determination of said usability received in said reception step, in correspondence with information indicating said current location, as geographical information; a communication subsystem specification step in which the server specifies a communication subsystem that can be used at said current location or at a location designated by said mobile unit, by looking up the geographical information stored in said storage means; and a notification step in which the server notifies said mobile unit of a usable communication subsystem specified in said communication subsystem specification step, in response to a request from the mobile unit.

According to these inventions, information indicating usability of a plurality of communication subsystems determined at the current location by the mobile unit is transmitted to the address of the server together with information indicating the current location. These items of information are transmitted from a plurality of mobile units and accumulated and stored in the storage means of the server. Of the accumulated information, information indicating the usability of communication subsystems is updated from time to time with lapse of time. Also, information indicating the current location is obtained by the communication subsystem whereby the most accurate inference of the current position can be achieved, of the communication subsystems that are capable of use by the mobile unit, so the accuracy of inference is high. Consequently, by designating any desired location, a mobile unit is able to receive from the server notification of dynamic, precise information indicating the communication subsystems that are usable at that location. As a result, the mobile unit can be apprised of usability of a plurality of communication subsystems that change with time, with high accuracy.

A server according to the present invention may comprise: communication means that receives the result of determination of said usability transmitted by transmission means of a mobile unit as described above, together with information indicating said current location; region specification means that specifies a geographical region to which the current location belongs, based on information indicating said current location received by said communication means; and storage means that stores in updateable fashion as frequency-of-use information the number of times per unit time that a usability determination result has been received by said communication means, in correspondence with the usable communication subsystem indicated by said determination result and the geographical region specified by said region specification means.

Preferably in a server according to the present invention said region specification means specifies the frequency-of-use of the each communication subsystem in the geographical region to which said current location or the location designated by said mobile unit belongs by looking up frequency-of-use information stored in said storage means; and said communication means notifies said mobile unit of the frequency-of-use specified by said region specification means in response to a request from the mobile unit.

A method of information provision according to the present invention includes: a determination step in which a mobile unit that is capable of communication using a plurality of communication subsystems determines usability of a plurality of communication subsystems at the current location of said mobile unit; a selection step in which the mobile unit selects a communication subsystem whereby the current location can be most accurately measured, of the communication subsystems determined as usable in said determination step; a transmission step in which the mobile unit infers said current location using the communication subsystem selected in said selection step and transmits the result of determination of said usability in said determination step, together with information indicating said current location, using the communication subsystem selected in said selection step; and a reception step in which a server receives the determination result of said usability transmitted in said transmission step, together with information indicating said current location; a region specification step in which the server specifies a geographical region to which the current location belongs, from the information indicating said current location received in said reception step; a storage step in which the server stores in storage means in updateable fashion as frequency-of-use information the number of times per unit time that the result of determination of usability has been received in said reception step, in correspondence with the usable communication subsystem indicated by said determination result and the geographical region specified in said region specification step; a frequency specification step in which the server specifies the frequency-of-use of the each communication subsystem in the geographical region to which said current location or the location designated by said mobile unit belongs, by looking up the frequency-of-use information stored in said storage means; and a notification step in which the server notifies said mobile unit of the frequency-of-use specified in said frequency specification step, in response to a request from the mobile unit.

According to these inventions, information indicating usability of a plurality of communication subsystems determined at the current location of a mobile unit is transmitted to the address of the server together with information indicating the current location. Of this information, the information indicating the current location is employed for totaling up the frequency-of-use of the communication subsystems in the geographical region to which the current location belongs. The result of totaling up the frequency-of-use is updated from time to time on the occasion of transmission of the above items of information from the plurality of mobile units. Also, the accuracy of inference of the information indicating the current location is high, since it is obtained by the communication subsystem, of the communication subsystems that are capable of being used by the mobile unit, that is capable of highest accuracy of inference of the current location. Accurate, dynamic notification of information indicating the communication subsystems that are capable of use at that location and the frequency-of-use thereof can therefore be received from the server when any desired location is designated by a mobile unit. In addition to usability of a plurality of communication subsystems that change with time, a mobile unit can therefore be apprised of the frequency-of-use thereof with high accuracy.

The plurality of communication subsystems may be for example a communication subsystem employing a mobile telephone network and a communication subsystem employing a wireless LAN. In a communication subsystem employing a mobile telephone network, the mobile units exchange various types of information simultaneously with a plurality of base stations of fixed location. A communication subsystem employing a mobile telephone network can therefore typically provide higher accuracy of inference of location than a communication subsystem using a wireless LAN. In cases where the mobile unit is capable of employing a communication subsystem using a mobile telephone network, the usability of the communication subsystem can therefore be registered in the server, in correspondence with more precise locational information, by employing this communication subsystem.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a view showing an example of data storage in a priority table.

FIG. 3 is a view showing an example of data storage in a geographical information DB.

FIG. 8A is a view showing an example of data storage in the frequency-of-use DB corresponding to the mobile telephone communication subsystem. FIG. 8B is a view showing an example of data storage in a frequency-of-use DB corresponding to the wireless LAN communication subsystem.

FIG. 9 is a flow chart given in explanation of frequency-of-use registration processing.

DESCRIPTION OF THE PREFERRED EMBODIMENTS

First Embodiment

Figure 1:
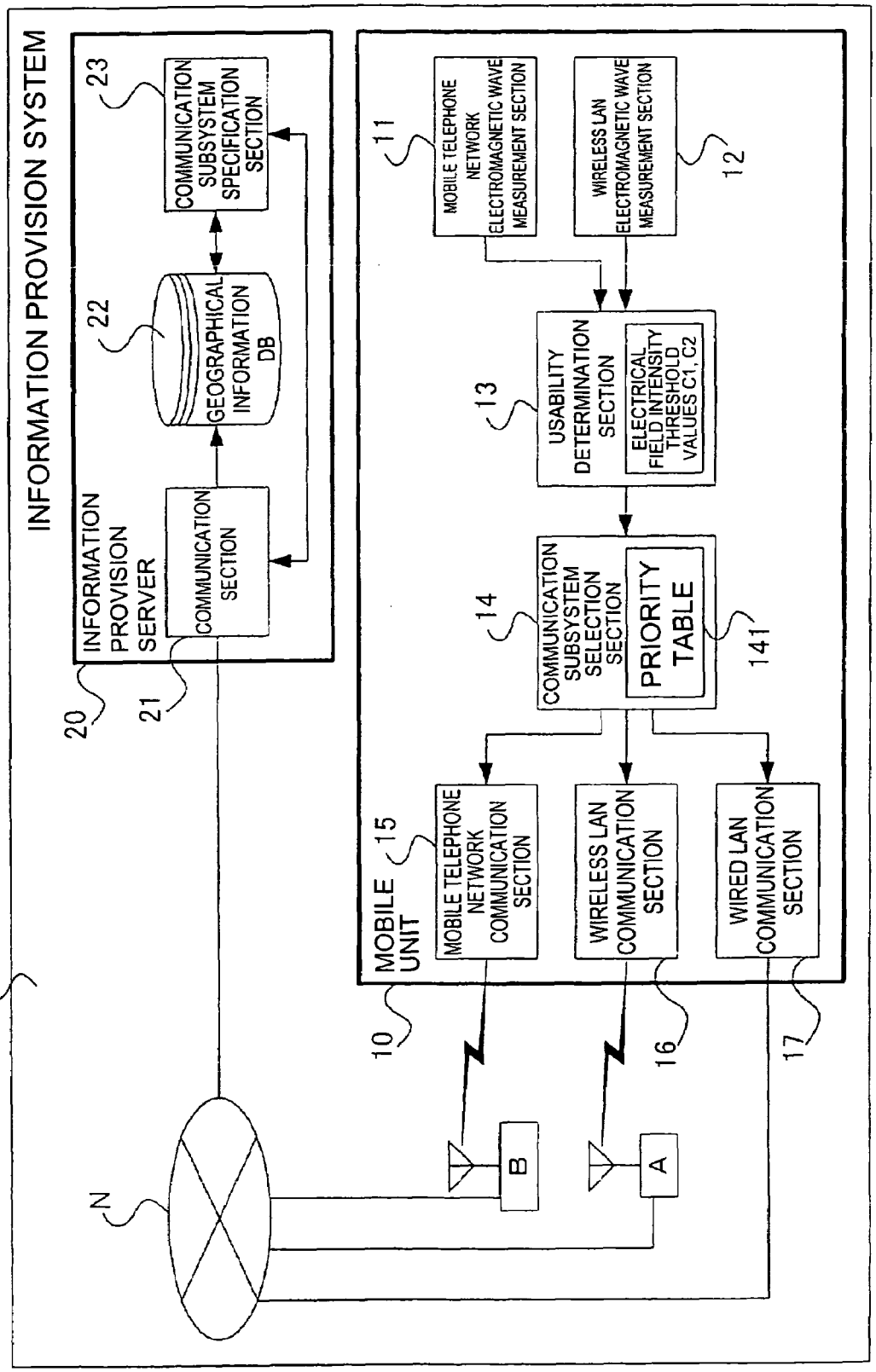
FIG. 1 is a block diagram showing the functional layout of an information provision system according to a first embodiment.

A first embodiment of the present invention is described below with reference to the appended drawings, which are given by way of example only. The layout of an information provision system is described. FIG. 1 is a view showing the overall layout of an information provision system 1 in this embodiment. As shown in FIG. 1, the information provision system 1 comprises at least a mobile unit 10 and an information provision server 20.

The mobile unit 10 is a wireless communication terminal capable of communication using three types of communication subsystem. The mobile unit 10 exchanges various types of data in both directions with the information provision server 20 by way of a base station B and communication network N, by a mobile telephone communication subsystem. Regarding the mobile telephone, the carrier and manufacturer, for example, do not matter and, furthermore, any desired mobile telephone communication subsystem may be employed. Available types of mobile telephone communication subsystems include for example the third generation communication subsystem CDMA (Code Division Multiple Access) or PDC (personal digital cellular) subsystem or analogue subsystem.

It is also possible for the mobile unit 10 to exchange various types of data in both directions with the information provision server 20 by way of an access point A and communication network N by a wireless LAN (local area network) communication subsystem. The wireless LAN need not necessarily be a LAN in accordance with IEEE (Institute of Electrical and Electronic Engineers) 802.11, so long as it is a LAN that can exchange data by wireless communication. For example, a LAN that performs wireless communication using Bluetooth (registered trademark) or IrDA (infra-red data association) is included.

In addition, it is also possible for the mobile unit 10 to use exchange of data by a wired LAN communication subsystem. A wired LAN of any desired type or standard may be employed so long as it constitutes a network constructed by a wired circuit, and may be for example an Ethernet (registered trademark).

Functionally speaking, the mobile unit 10 comprises: a mobile telephone network electromagnetic wave measurement section 11, a wireless LAN electromagnetic wave measurement section 12, a usability determination section 13 (corresponding to determination means), a communication subsystem selection section 14 (corresponding to selection means), a mobile telephone network communications section 15 (corresponding to transmission means) a wireless LAN communication section 16 (corresponding to transmission means) and a wired LAN communication section 17. These functional constituent elements are implemented by using a CPU (central processing unit) to execute software stored in on-board memory such as an EEPROM (electrically erasable and programmable read-only memory).

The details of the various constituent elements of the mobile unit 10 are described below.

The mobile telephone network electromagnetic wave measurement section 11 periodically measures the intensity of the electromagnetic waves (electrical field intensity) received from the base station B for the mobile telephone network, and outputs the result of this measurement to the usability determination section 13. Likewise the wireless LAN electromagnetic wave measurement section 12 periodically measures the intensity of the electromagnetic waves (electrical field intensity) received from the access point A for the wireless LAN and outputs the result of this measurement to the usability determination section 13. Regarding the measurement of the electrical field intensity, it should be noted that this need not necessarily be measured by the mobile unit 10 itself: a mode could be adopted in which electrical field intensity data corresponding to the various communication subsystems is acquired from an information report transmitted from the base station or access point.

The usability determination section 13 is provided with an electrical field intensity threshold value C1 for the mobile telephone communication subsystem and an electrical field intensity threshold value C2 for the wireless LAN communication subsystem. The lower limit of the electrical field intensity threshold value C1 is the electrical field intensity required for use of the mobile telephone communication subsystem by the mobile unit 10; the lower limit of the electrical field intensity threshold value C2 is the electrical field intensity required for use of the wireless LAN communication subsystem by the mobile unit 10. If the electrical field intensity measured by the mobile telephone network electromagnetic wave measurement section 11 is at or above the electrical field intensity threshold value C1, the usability determination section 13 determines that the mobile telephone communication subsystem can be used; if the electrical field intensity measured by the wireless LAN electromagnetic wave measurement section 12 is at or above the electrical field intensity threshold value C2, the usability determination section 13 determines that the wireless LAN communication subsystem can be used. The usability determination section 13 outputs the result of the determination of usability to the communication subsystem selection section 14.

The communication subsystem selection section 14 selects the communication subsystem that is to be actually used from the communication subsystems that are determined as usable in accordance with the usability determination result that is input from the usability determination section 13. When selecting the communication subsystem, the communication subsystem selection section 14 refers to the priority table 141 shown in FIG. 2. As shown in FIG. 2, the priority table 141 comprises a use priority storage region 141*a* and a communication subsystem type storage region 141*b* and holds "mobile telephone" as the communication subsystem of first priority. It also holds "wireless LAN" as the communication subsystem of second priority and "wired LAN" as the communication system of third priority. The priority is set in the order of higher precision of inferring the current location of the mobile unit 10.

If there are a plurality of communication subsystems which are determined as being usable by the usability determination section 13, of these, the communication subsystem selection section 14 selects as the communication subsystem to be actually used the communication subsystem which is of highest priority. If only one communication subsystem is determined as being usable by the usability determination section 13, the communication subsystem selection section 14 selects this communication subsystem irrespective of its priority. Further, if no communication subsystem is determined as being usable by the usability determination section 13, the communication subsystem selection section 14 selects a wired LAN. The communication subsystem selection section 14 notifies the communication system corresponding to the selected communication subsystem of the fact that the communication subsystem of this communication section has been selected and also notifies it of the result of the determination of usability of the various communication subsystems.

When the mobile telephone network communication section 15 receives from the communication subsystem selection section 14 notification to the effect that the mobile telephone communication subsystem has been selected and notification of the result of the determination of usability of the various communication subsystems, it infers the current location of the mobile unit 10 by using the mobile telephone communication subsystem. Inference of the current location involves a measurement technique which is common knowledge so a detailed description thereof will be dispensed with but is based for example on the strength of the electrical field intensity. Specifically, the greater the intensity of the electromagnetic waves received from the base station B, the shorter is inferred to be the distance between the mobile unit 10 and the base station B and the lower the intensity of the electromagnetic waves received from the base station B the greater is inferred to be the distance between the mobile unit 10 and the base station B. The mobile telephone network communication section 15 infers the current location of the mobile unit 10 from the intensity of the electromagnetic waves from at least three base stations, including the nearest base station (base station B) to the mobile unit 10, and the latitude and longitude of the base station B. The mobile telephone network communication section 15 transmits the result of the usability determination of each communication subsystem, together with the inferred current location, to the information provision server 20 via the base station B and the communication network N.

When the wireless LAN communication section 16 receives from the communication subsystem selection section 14 notification to the effect that the wireless LAN communication subsystem has been selected and notification of the result of the determination of usability of each communication subsystem, it infers the current location of the mobile unit 10 using the wireless LAN communication subsystem. Since the communication region of a wireless LAN access point is much smaller than that of a mobile telephone base station, the location of a mobile unit 10 can be roughly inferred by detecting the location of the access point during communication by the mobile unit 10. However, since the access points are scattered and show little difference of electric field intensity depending on distance from the mobile unit 10, inference of location based on the electromagnetic wave intensity as described above is difficult. Consequently, inference of location using a wireless LAN is typically inferior in accuracy to inference of location using a mobile telephone network.

The wireless LAN communication section 16 transmits the result of determination of usability of each communication subsystem to the information provision server 20 via the access point A and communication network N, together with the inferred current location.

When a wired LAN communication section 17 receives from the communication subsystem selection section 14 notification of the selection of a wired LAN communication subsystem, it commences communication using the wired LAN communication subsystem.

The information provision server 20 collects information regarding communication subsystem usability and current location transmitted from the plurality of mobile units including the mobile unit 10 and dynamically generates information (geographical information) indicating the geographical usability of each communication subsystem. The geographical information that is thus generated is successively accumulated in a database and is employed in the notification of communication subsystems that are capable of being used at any desired location, for example in response to a request from a mobile unit.

Functionally speaking, the information provision server 20 comprises a communication section 21 (corresponding to communication means), a geographical information DB (database) 22 (corresponding to storage means) and a communication subsystem specification section 23 (corresponding to communication subsystem specification means). The function of the geographical information DB 22 is implemented by an auxiliary storage device such as an HDD (hard disk drive) as a physical constituent element. The other constituent elements, namely, the communication section 21 and communication subsystem specification section 23, are realized by software stored in the aforesaid auxiliary storage device being executed by a CPU.

The details of the various constituent elements of the information provision server 20 are described below.

The communication section 21 receives through the communication network the result of inference of the current location transmitted thereto from the mobile unit 10 and other mobile units having a similar function and the result of determination of usability of the various communication subsystems at the current location in question and stores these results in the geographical information DB 22.

Also, when the communication section 21 receives from a mobile unit a request for notification of communication subsystems at a given location, the communication section 21 outputs the aforesaid location to the communication subsystem specification section 23 and gives instructions for specification of a communication subsystem that is capable of being used at the location in question. When the communication section 21 inputs the specified communication subsystem, it gives notification of this communication subsystem to the mobile unit that requested such notification.

The result of inference of the current location that was input from the communication section 21 and the result of determination of usability are stored in updateable fashion in the geographical information DB 22. FIG. 3 is a view showing an example of data stored in the geographical information DB 22. As shown in FIG. 3, the geographical information DB 22 comprises a location storage region 22*a* and a communication subsystem storage region 22*b*. The location storage region 22*a* stores data indicating the result of inference of the current location of a mobile unit (for example "latitude X1, longitude Y1"). In this embodiment, the data of a point indicated by a specified latitude and longitude was taken as an example of such data, but it would also be possible to store data indicating a range such as for example "latitude X1 to X3, longitude Y2 to Y5". The communication subsystem storage region 22*b* stores the result of identification of the communication subsystem that is usable at the corresponding location (for example "mobile telephone"). Even for the same location, the communication subsystems that are usable vary over time due to the effect of mobile units that are simultaneously connected or obstacles or weather, so the data in the communication subsystem storage region 22*b* is updated from time to time.

When the communication section subsystem specification section 23 is instructed by the communication section 21 to specify a communication subsystem, the communication subsystem specification section 23 refers to the geographical information DB 22 and specifies a communication subsystem corresponding to the location that was input and outputs this communication subsystem to the communication section 21.

Figure 4:
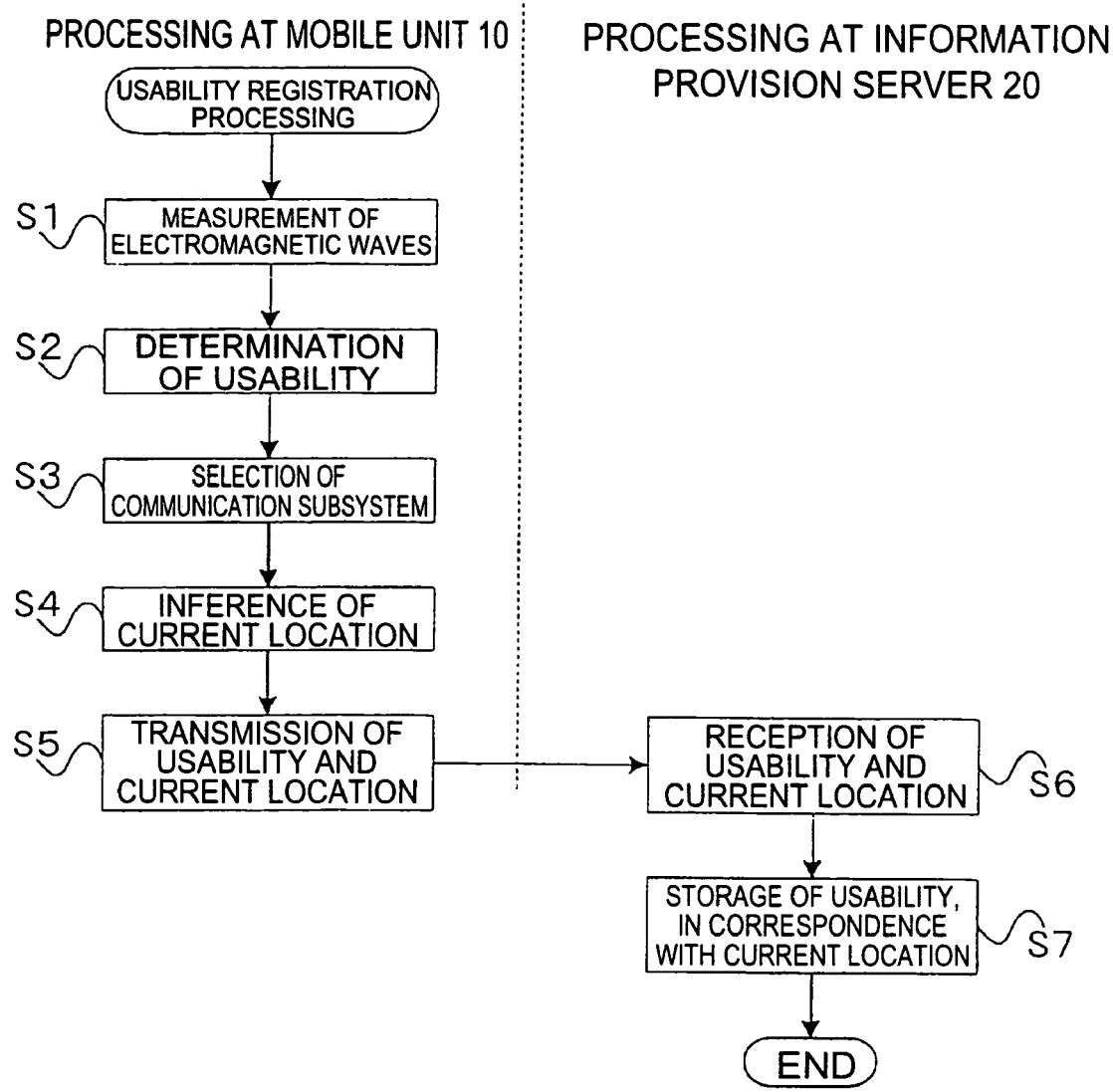
FIG. 4 is a flowchart given in explanation of usability registration processing.

Next, the operation of the information provision system 1 will be described in conjunction with the description of the various steps constituting a method of information provision according to the present invention. FIG. 4 is a flow chart showing processing for registration of usability that is executed by the information provision system 1. The processing for registration of usability is processing that is executed for registering in the information provision server 20 the usability of the various communication subsystems at each location, in order to make it possible to look up which communication subsystem is capable of being used at a location of a mobile unit 10 that can be specified at will.

In S1, the mobile telephone network electromagnetic wave measurement section 11 of the mobile unit 10 measures the intensity (electrical field intensity) of the electromagnetic waves received from the base station B for the mobile telephone network. Likewise, the wireless LAN electromagnetic wave measurement section 12 of the mobile unit 10 measures the intensity (electrical field intensity) of the electromagnetic waves received from a wireless LAN access point A.

In S2, the usability determination section 13 of the mobile unit 10 compares the electrical field intensities of the various communication subsystems measured in S1 with the respective threshold values C1, C2 of the corresponding communication subsystems. As a result of the comparison, it identifies a communication subsystem for which the measured electrical field intensity is at least the threshold value as a communication subsystem capable of being used, and identifies a communication subsystem for which the measured electrical field intensity is below the threshold value as a communication subsystem that is incapable of being used.

In S3, the communication subsystem selection section 14 of the mobile unit 10 selects the communication subsystem of highest priority of the communication subsystems identified as usable in S2 as the communication subsystem to be actually employed. It should be noted that, if in S2 neither the mobile telephone nor the wireless LAN communication subsystem is identified as being usable, communication by the wired LAN communication section 17 is selected.

In S4, the current location of the mobile unit 10 is inferred. The inference of the current location is performed using the communication subsystem selected in S3. Since, in S3, the communication subsystem of highest precision of inferring location is selected by referring to the priority table 141, the mobile unit 10 is able to reflect locational information which is as precise as possible to the communication subsystem usability information.

In S5, information indicating the usability determined in S2 and the current location inferred in S4 is transmitted to the address of the information provision server 20 by the communication section (mobile telephone network communication section 15 or wireless LAN communication section 16) corresponding to the communication subsystem selected in S3. This transmission of information is effected via the base station B in the case where the mobile telephone is selected in S3 as the communication subsystem and is effected via the access point A in the case where a wireless LAN is selected in S3 as the communication subsystem.

Transmission of information indicating the usability and current location in S5 may be effected automatically with fixed period (for example of the order of a few minutes to a few tens of minutes) or may be effected on the occasion of an instruction from the user of the mobile unit 10. In such cases, the information provision server 20 may construct the geographical information DB 22 without requiring a request to transmit this information in respect of the mobile unit. All the mobile units, including the mobile unit 10, may then transmit the aforementioned information on the occasion of a transmission request by the information provision server 20. In this case, the updating interval of the geographical information DB 22 maybe suitably adjusted at the server side.

In S6, information indicating the usability and current location transmitted in S5 is received by the communication section 21 of the information provision server 20.

In S7, the usability information received in S6 is stored in the geographical information DB 22 in a manner in correspondence with the current location. The mode of storage was described above with reference to FIG. 3 and so will not be discussed in detail at this point, but is not restricted to the mode shown in FIG. 3. For example, it may be arranged to store numerals for identifying usable communication subsystems, by for example using "0" in the case where there is no usable communication subsystem, using "1" in the case where only the mobile telephone is usable, using "2" in the case where only the wireless LAN is usable, and "3" in the case where both communication subsystems are usable.

The information provision server 20 collects information in the same way from a large number of mobile units including the mobile unit 10 indicating communication subsystem usability and current location and stores this in the geographical information DB 22. In this way, the communication subsystem usability at all locations where there is a possibility of a mobile telephone being present is registered as geographical information.

Next, the processing for acquisition of information by the mobile unit 10 indicating communication subsystem usability at an arbitrary location using the geographical information registered in the information provision server 20 will be described with reference to FIG. 5.

Figure 5:
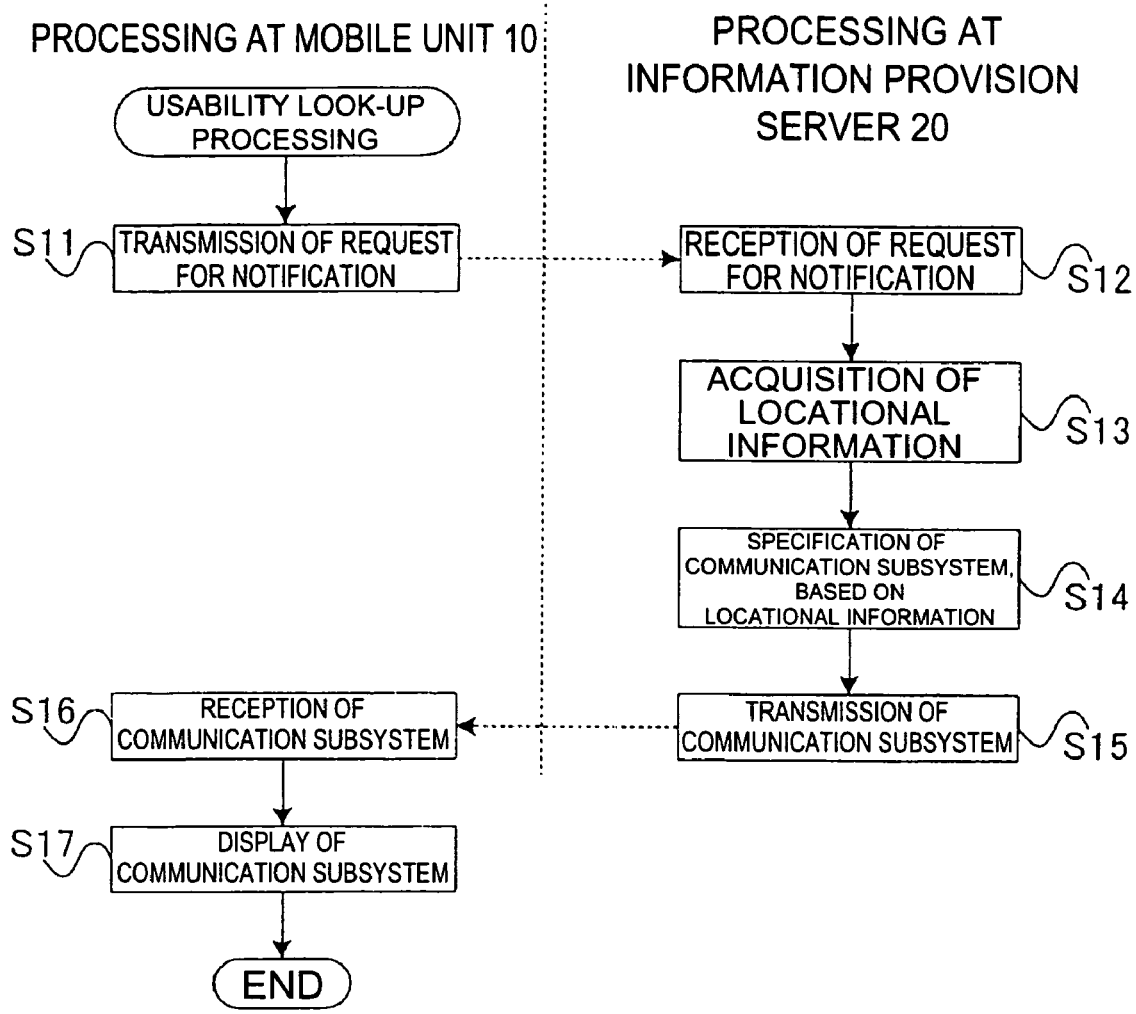
FIG. 5 is a flowchart given in explanation of usability look-up processing.

FIG. 5 is a flow chart given in explanation of processing for looking up usability.

First of all, in S11, a request for notification of a communication subsystem is transmitted by any of the communication sections 15, 16 or 17 provided in the mobile unit 10. This request for notification includes at least information indicating the current location of the mobile unit 10 or information indicating a location specified by the mobile unit 10.

In S12, the communication section 21 of the information provision server 20 receives the notification request that was transmitted in S11.

In S13, the communication subsystem specification section 23 acquires locational information from the notification request received in S12.

In S14, the communication subsystem specification section 23 specifies a communication subsystem that is usable at the current time-point at the location in question, based on the locational information acquired in S13. Referring again to FIG. 3, if the location indicated by the locational information is for example "latitude X3, longitude Y3", the currently usable communication subsystems "mobile telephone, wireless LAN" are specified. On the other hand, if the location is "latitude X7, longitude Y7", the currently usable communication subsystem is specified as "mobile telephone".

In S15, the communication section 21 of the information provision server 20 transmits information indicating the communication subsystem specified in S14, addressed to the mobile unit 10.

In S16, one of the communication sections 15, 16, or 17 provided in the mobile unit 10 receives the information indicating the communication subsystem that was transmitted in S15.

In S17, the information indicating the communication subsystem that was received in S16 is displayed on a display device (not shown) of the mobile unit 10. An example of the information displayed at this point is shown in FIG. 6.

Figure 6:
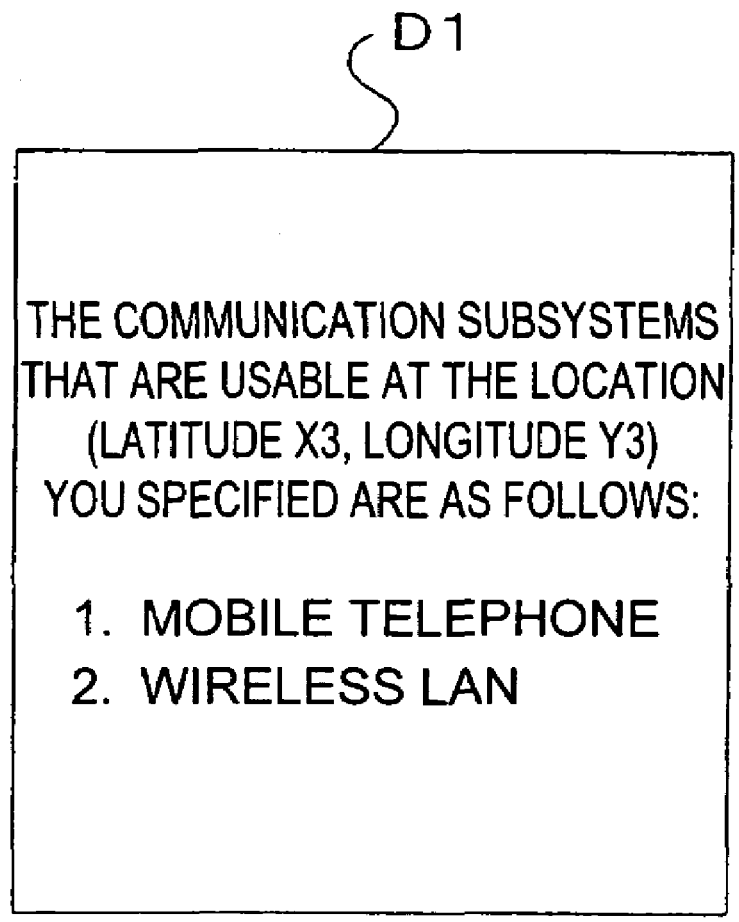
FIG. 6 is a view showing an example of information displayed by a mobile unit as a result of execution of usability look-up processing.

FIG. 6 is a view showing an example of the information displayed when "latitude X3, longitude Y3" is designated as the location of the communication subsystem in correspondence with the user of the mobile unit 10. As described above, at the location "latitude X3, longitude Y3", currently both wireless communication subsystems are usable. Consequently, as shown in FIG. 6, text data indicating both the communication subsystems "1. Mobile telephone and 2. Wireless LAN" is displayed by the mobile unit 10. Also, when neither communication subsystem is usable, text data such as "Wireless communication cannot be used at the designated location." is displayed. It should be noted that the mode of display need not necessarily be text display but could be image display combined with for example a map.

As described above, in an information provision system 1 according to the first embodiment, the information provision server 20 collects information indicating usability of communication subsystems at the current location from a plurality of mobile units including the mobile unit 10. The information that is collected is dynamic and is updated from time to time in the geographical information DB 22. Also, the current location is inferred by utilizing the communication subsystem whereby such inference can be performed with the maximum possible precision by the mobile units. The users of the mobile units can therefore easily and rapidly look up the usability of the communication subsystem whereby the latest information is accurately reflected, since the communication subsystem usability is registered in a manner in correspondence with current location in respect of all of the mobile units.

A mobile unit 10 can also easily be apprised not only of communication subsystem usability at the current location but also of usability at a location different from the current location, for example a location where the mobile unit is not currently present but is expected to move to in the future.

In addition, by referring to the data stored in the geographical information DB 22, the communication service provider can easily be apprised of areas (vacant areas) where neither the mobile telephone nor wireless LAN communication subsystem can be used. In this way, the efficiency of area planning can be improved.

Second Embodiment

Next, a second embodiment of the present invention will be described with reference to FIG. 7 to FIG. 11. First of all, a brief description of the differences between this embodiment and the first embodiment will be given. In the first embodiment, it was made possible to look up the usability of the communication subsystems at any desired location. In contrast, in this embodiment, it is possible to look up the frequency-of-use of communication subsystems in the area to which any desired location belongs.

Figure 7:
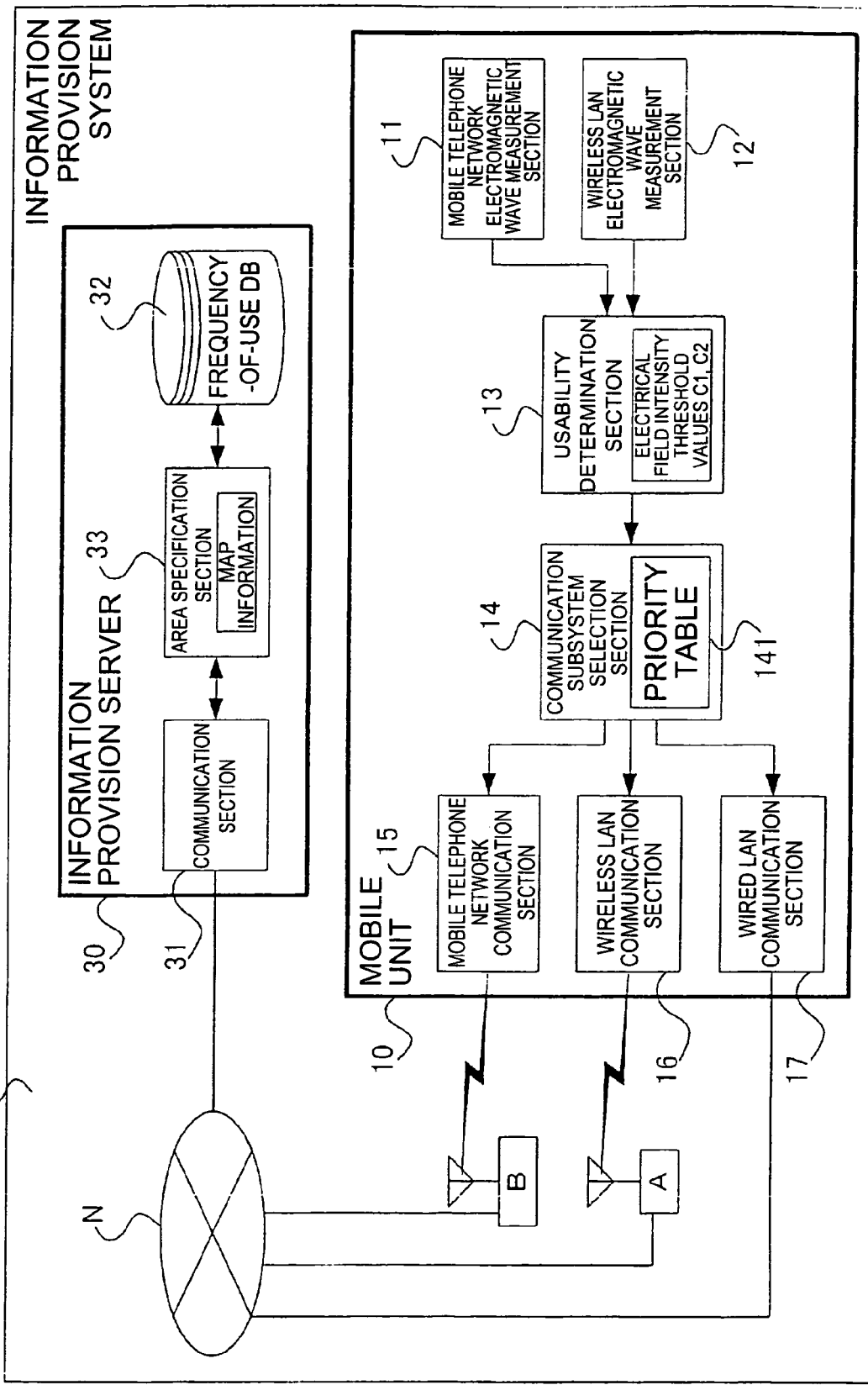
FIG. 7 is a block diagram showing the functional layout of an information provision system according to a second embodiment.
Figure 10:
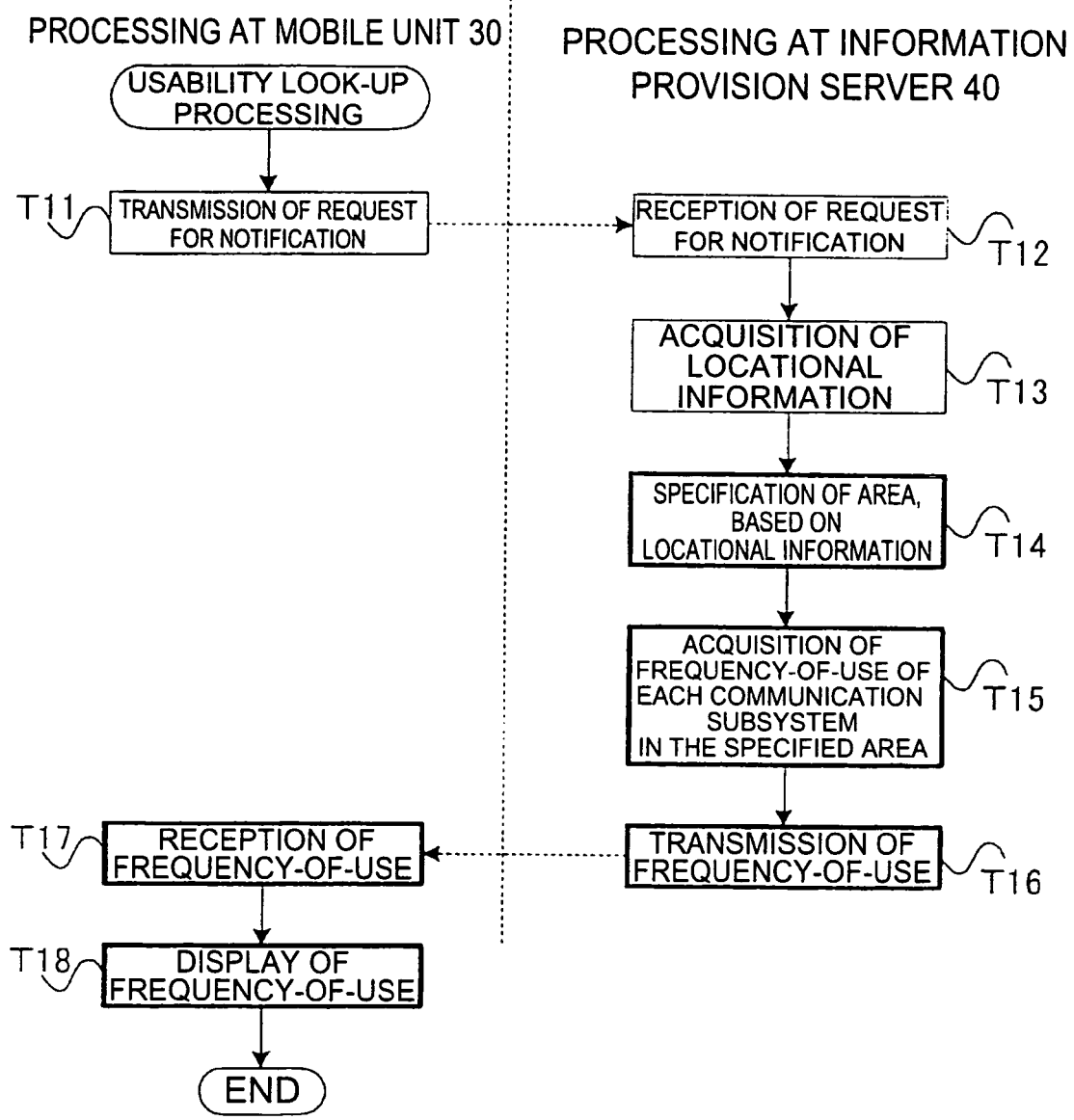
FIG. 10 is a flow chart given in explanation of frequency-of-use look-up processing.

FIG. 7 is a block diagram showing the functional layout of an information provision system 2 according to the second embodiment. As shown in FIG. 7, the layout of the mobile unit in this embodiment is the same as the layout of the mobile unit 10 described in detail in the first embodiment; corresponding constituent elements are therefore given the same reference numerals and further description thereof is dispensed with. Also, the layout of the information provision server in this embodiment is similar to the layout of the information provision server 20 described in detail in the first embodiment, so reference symbols in the same series (with the same terminal numerals) are given to similar structural elements and a detailed description is given of the differences with respect to the first embodiment.

Specifically, as shown in FIG. 7, the information provision server 30 is constituted functionally comprising a communication section 31 (corresponding to communication means), a frequency-of-use DB 32 (corresponding to storage means) and an area specification section 33 (corresponding to region specification means). The function of the frequency-of-use DB 32 is realized by an auxiliary storage device such as an HDD constituting a physical constituent element. The other constituent elements, namely, the communication section 31 and area specification section 33, are realized by a CPU executing software stored on the auxiliary storage device.

The various constituent elements of the information provision server 30 are described in detail below.

The communication section 31 receives via the communication network N information indicating the current location and the result of determination of usability transmitted from the mobile unit 10 and other mobile units having the same function as this and outputs this information to the area specification section 33.

Also, on receiving from a mobile unit a request for notification of frequency-of-use at a given location, the communication section 31 outputs the aforementioned location to the area specification section 33 and gives instructions for acquisition of the frequency-of-use of the various communication subsystems in the area to which this location belongs. When the communication section 31 inputs the specified frequency-of-use, it gives notification thereof to the mobile unit that requested such notification of this frequency-of-use, together with the communication subsystems.

The frequency-of-use DB 32 stores in updateable fashion the areas and frequency-of-use for each communication subsystem. The "area" means a geographical region where there is a possibility of mobile units, including the mobile unit 10, being present; the way in which it is formed depends on the mode of management of the communication subsystem. For example, if the communication subsystem manages the areas for each base station or access point, the area is the range that can be reached by electromagnetic waves from the base station or the access point. Also, if the communication subsystem manages the areas separately for each administrative unit of local government, the area may be the town "Yokosuka-shi in Kanagawa prefecture".

Also, the frequency-of-use means the number of times per unit time (for example, about 1 hour) that the usability and current location of each communication subsystem is received by the communication section 31. The frequency-of-use is successively updated with lapse of time.

The frequency-of-use DB 32 comprises an area storage region that stores area identifiers and a frequency-of-use storage region that stores frequency-of-use, for each communication subsystem. The frequency-of-use DB 32 comprises, as a storage region corresponding to the mobile telephone communication subsystem, an area storage region 32a and frequency-of-use storage region 32b. As shown in FIG. 8A, the area storage region 32a stores area identifiers (for example A1, A2, A3 . . . ) and the frequency-of-use storage region 32b stores the number of times of use (for example 10, 15, 05 . . . ) for example in the nearest hour as frequency-of-use information.

The frequency use DB 32 further comprises, as storage regions corresponding to the wireless LAN communication subsystem, an area storage region 32c and frequency-of-use storage region 32d. As shown in FIG. 8B, the area storage region 32c stores area identifiers (for example A1, A2, and A3 . . . ) and the frequency-of-use storage region 32b stores frequency-of-use information i.e. for example the number of times of use in the nearest hour (for example 03, 00, 10 . . . ).

In this way, the frequency-of-use DB 32 stores frequency-of-use information in updateable fashion, in correspondence with the geographical region in which the mobile unit is located and the communication subsystem that is capable of being used by the mobile unit.

When information indicating the current location and the result of determination of usability is input thereto from the communication section 31, the area specification section 33 specifies the area to which this location belongs, based on existing map information. Accompanying this, the area specification section 33 adds 1 to the frequency-of-use corresponding to the area specified and the communication subsystem that was determined as usable, and stores the result in the frequency-of-use DB 32.

When instructions are received from the communication section 31 to acquire the frequency-of-use at a given location, the area specification section 33 specifies the area to which this location belongs, based on the existing map information. By referring to the frequency-of-use DB 32, the area specification section 33 then acquires the frequency-of-use of each of the communication subsystems in the specified area and outputs the result to the communication section 31.

Next, the frequency-of-use registration processing that is executed and controlled by the information provision system 2 in the second embodiment will be described. The steps comprising the information provision method according to the present invention will also be described. The present frequency-of-use registration processing includes a plurality of steps that are common with the usability registration processing (see FIG. 4) described in detail in the first embodiment. Specifically, the processing of T1 to T6 shown in FIG. 9 corresponds to S1 to S6 shown in FIG. 4.

The characteristic steps (processing indicated within the thick-lined frame of FIG. 9) in the present frequency-of-use registration processing are described below.

In T7, the area specification section 33 of the information provision server 30 specifies the area to which the location in question belongs from the information indicating the current location that was received in T6. This area specification is performed by referring to the existing map information (area map), which contains the correspondence relationship between location and area.

In T8, the area specification section 33 updates the frequency-of-use information in the frequency-of-use DB 32 as required. Specifically, 1 is added to the frequency-of-use corresponding to the usable communication subsystem indicated by the indication of usability received in T6 and corresponding to the area specified in T7. Hereinbelow, a more specific description of the processing of T8 is given, assuming a case in which the result of determination of usability in T2 indicates that both the mobile telephone and wireless LAN communication subsystems are usable. For example, in a case where the area 3 is specified from the current location of the mobile unit 10, the numerical value of the cross-hatched portion shown in FIG. 8A is updated from "05" to "06" and the numerical value of the cross-hatched portion shown in FIG. 8B is updated from "10" to "11".

It should be noted that, in this embodiment, the frequency-of-use corresponding to communication subsystems determined as usable was arranged to be updated irrespective of whether these communication subsystems were actually used. However, it could be arranged to update only frequencies of use corresponding to communication subsystems that are actually employed. In this way, a frequency-of-use DB 32 can be constructed reflecting frequencies of use that are closer to actuality.

Next, frequency-of-use look-up processing that is executed and controlled by the information provision system 2 in the second embodiment will be described. In addition, steps comprising an information provision method according to the present invention will be described. The present frequency-of-use look-up processing includes a plurality of steps that are common with the usability look-up processing (see FIG. 5) described in detail in the first embodiment. Specifically, the processing of T11 to T13 shown in FIG. 10 corresponds to S11 to S13 shown in FIG. 5. However, this embodiment differs from the first embodiment in that the request for notification in this embodiment is a request for notification of frequency-of-use instead of a request for notification of communication subsystem.

The characteristic steps (processing indicated within the thick-lined frame of FIG. 10) in the present frequency-of-use look-up processing are described below.

In T14, the area specification section 33 specifies the area to which the location in question belongs based on the locational information that was acquired in T13.

In T15, the area specification section 33 acquires the current frequency-of-use of each communication subsystem in the area specified in T14 from the frequency-of-use DB 32.

For example, if the location indicated by the location information is "latitude X3, longitude Y3" and the mobile unit is in "area A2", the frequency-of-use information "15" (see FIG. 8A) of mobile telephones corresponding to area A2 is acquired from the frequency-of-use storage region 32b. Likewise, the frequency-of-use "00" (see FIG. 8B) of the wireless LAN corresponding to area A2 is acquired from the frequency-of-use storage region 32d.

In T15, the communication section 31 of the information provision server 30 transmits the frequency-of-use information acquired in T15 to the address of the mobile unit 10.

In T16, one of the communication sections 15, 16, 17 provided in the mobile unit 10 receives the frequency-of-use information transmitted in T15.

Figure 11:
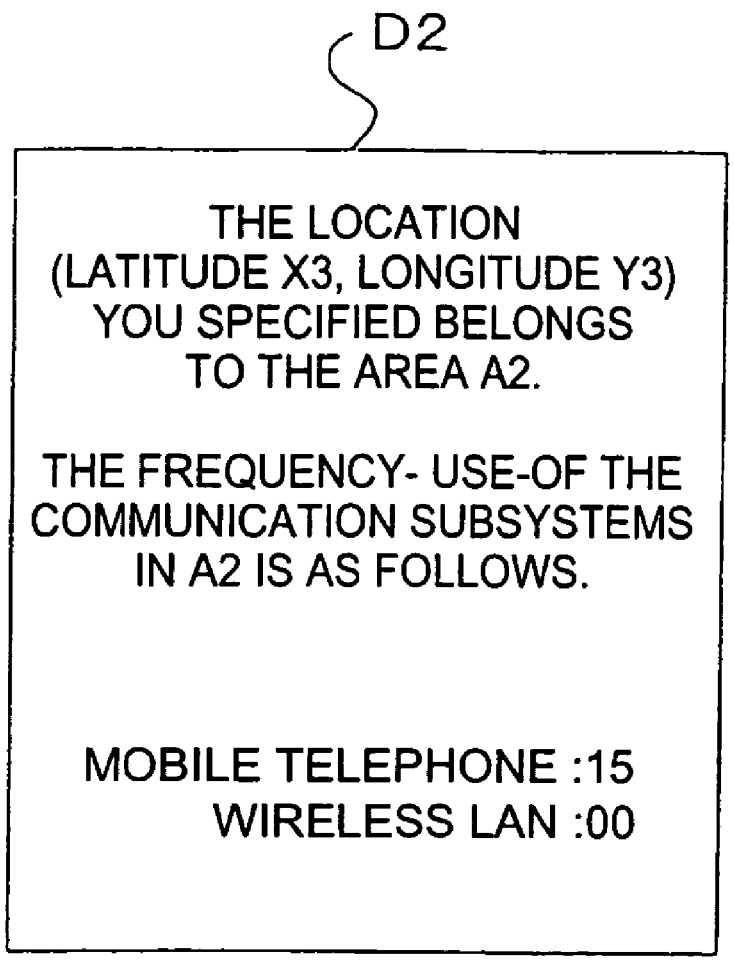
FIG. 11 is a view showing an example of information displayed by a mobile unit as a result of execution of frequency-of-use look-up processing.

In T17, the frequency-of-use information received in T16 is displayed on the display device (not shown) of the mobile unit 10. FIG. 11 shows an example of the information which is then displayed.

FIG. 11 is a view showing the information that is displayed when "latitude X3, longitude Y3" is specified as the location of the communication subsystem referenced by the user of the mobile unit 10. As described above, the location "latitude X3, longitude Y3" belongs to the area A2 and the frequency-of-use at the current time-point is "15" in the case of mobile telephones and "0" in the case of wireless LANs. Consequently, as shown in FIG. 11, text data indicating the frequencies of use: "Mobile telephone: 15, Wireless LAN: 00" is displayed at the mobile unit 10. Also, if one communication subsystem is unusable, text data such as: "Wireless communication cannot be used in this area." may be displayed. In addition, if the frequency-of-use exceeds a prescribed threshold value, text data such as "The wireless communication capacity is insufficient in this area." may be displayed. It should be noted that the mode of display is not restricted to text display and image display combined with a map or the like may be employed.

As described above, in the information provision system 2 of the second embodiment, the information provision server 30 collects information indicating the usability of communication subsystems at the current location from the plurality of mobile units including the mobile unit 10. Every time such information is collected, the frequency-of-use of the area and the corresponding subsystem is updated in the frequency-of-use DB 32. Also, the aforementioned current location is the current location inferred by using the communication subsystem whereby inference with the highest accuracy possible by the mobile units can be achieved. Consequently, by registering the frequency-of-use by the mobile units of the area designated in accordance with this current location, users of the mobile units can look up in a simple and rapid fashion precise frequency-of-use information that reflects the latest information.

Also, in addition to the frequency-of-use of the various communication subsystems at the current location, the mobile unit 10 can easily be apprised of the frequency-of-use at a location different from the current location, for example a location where the mobile unit is not currently present but is expected to move to in the future.

In addition, by referring to the data stored in the frequency-of-use DB 32, the communication service provider can easily be apprised of areas where the frequency-of-use is higher than the allowed communication capacity i.e. areas where there tends to be an insufficiency of wireless resources. In this way, planning of construction of mobile communication areas can be performed efficiently.

It should be noted that the present invention is not restricted to the features described in the first and second embodiment and various suitably modified modes could be adopted without departing from its essence. For example, in the present embodiments, mobile telephones and wireless LANs were indicated by way of example as communication subsystems capable of use by a mobile unit 10. However, the communication subsystems could both be mobile telephone communication subsystems, so long as they are mutually different, such as for example third-generation mobile telephones and PDC (personal digital cellular).

Figure 12:
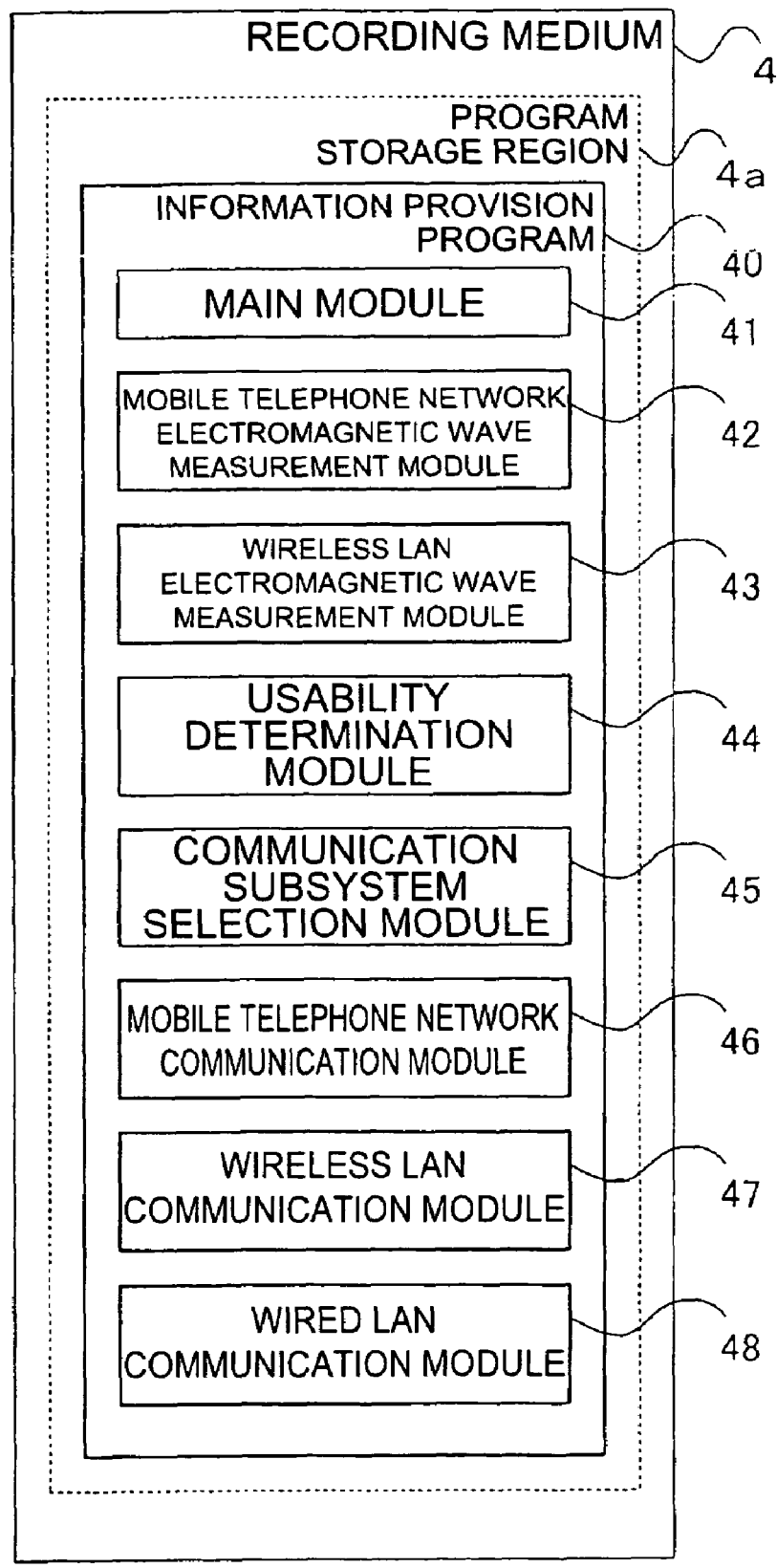
FIG. 12 is a view showing example of the constitution of an information provision program stored in a recording medium.

Finally, a program for implementing information provision techniques as described above will be described. An information provision program 40 according to the present invention can be executed by a mobile unit 10 capable of employing mobile telephone and wireless LAN communication subsystems. As shown in FIG. 12, the information provision program 40 is stored in a program storage region 4a formed in a recording medium 4, which will usually be for example a magnetic disk or optical disc. The information provision program 40 includes a main module 41, a mobile telephone network electromagnetic wave measurement module 42, a wireless LAN electromagnetic wave measurement module 43, a usability determination module 44, a communication subsystem selection module 45, a mobile telephone network communication module 46, a wireless LAN communication module 47, and a wired LAN communication module 48.

The main module 41 is the module (constituent unit) that exercises overall control of the processing that is executed by the mobile unit 10. The functions that are realized by executing the modules: the mobile telephone network electromagnetic wave measurement module 42, wireless LAN electromagnetic wave measurement module 43, usability determination module 44, communication subsystem selection module 45, mobile telephone network communication module 46, wireless LAN communication module 47, and wired LAN communication module 48 are respectively the same as the functions of the mobile telephone network electromagnetic wave measurement section 11, wireless LAN electromagnetic wave measurement section 12, usability determination section 13, communication subsystem selection section 14, mobile telephone network communications section 15, wireless LAN communication section 16 (corresponding to transmission means) and wired LAN communication section 17 provided in the mobile unit 10.

An arrangement may be adopted wherein part or all of the information provision program 40 is transferred through a transfer medium such as a communication circuit and is received by other equipment, where it is recorded (including installation).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An information provision system, comprising:
   a mobile unit capable of communication using a plurality of communication subsystems, comprising
      determination means that determines usability of the plurality of communication subsystems at the current location of said mobile unit;
      selection means that selects a communication subsystem whereby the current location can be measured with the greatest accuracy, of the communication subsystems that are determined as usable by said determination means; and
      transmission means that measures said current location using the communication subsystem selected by said selection means and transmits the result of determination of said usability by said determination means, together with information indicating said current location, using the communication subsystem selected by said selection means, and a server, comprising communication means that receives the result of the determination of said usability transmitted by transmission means of the mobile unit together with the information indicating said current location;

region specification means that specifies a geographical region to which the current location belongs, based on information indicating said current location received by said communication means; and storage means that stores in updateable fashion as frequency-of-use information the number of times per unit time that a usability determination result has been received by said communication means, in correspondence with the usable communication subsystem indicated by said determination result and the geographical region specified by said region specification means.

2. The system of claim 1, wherein:

said region specification means specifies the frequency-of-use of the each communication subsystem in the geographical region to which said current location or the location designated by said mobile unit belongs by looking up frequency-of-use information stored in said storage means; and said communication means notifies said mobile unit of the frequency-of-use specified by said region specification means in response to a request from the mobile unit.

3. A method of information provision for a mobile unit capable of communication using a plurality of communication subsystems, comprising:

at the mobile station, a determination step of determining usability of the plurality of communication subsystems at the current location of said mobile unit;

a selection step of selecting a communication subsystem whereby the current location can be most accurately measured, of the communication subsystems determined as usable in said determination step; and a transmission step of measuring said current location using the communication subsystem selected in said selection step and transmitting the result of determination of said usability in said determination step, together with information indicating said current location, using the communication subsystem selected in said selection step, and at a server, a reception step for receiving the determination result of said usability transmitted in said transmission step, together with information indicating said current location;

a region specification step of specifying a geographical region to which the current location belongs, based on the information indicating said current location received in said reception step;

a storage step of storing in storage means in updateable fashion as frequency-of-use information the number of times per unit time that the result of determination of usability has been received in said reception step, in correspondence with the usable communication subsystem indicated by said determination result and the geographical region specified in said region specification step;

a frequency specification step of specifying the frequency-of-use of the each communication subsystem in the geographical region to which said current location or the location designated by said mobile unit belongs, by looking up the frequency-of-use information stored in said storage means; and a notification step of notifying said mobile unit of the frequency-of-use specified in said frequency specification step, in response to a request from the mobile unit.

* * * * *